US008353157B2

(12) United States Patent

Lech et al.

(10) Patent No.: US 8,353,157 B2

(45) Date of Patent: Jan. 15, 2013

(54) OPEN CENTER HYDRAULIC SYSTEM

(75) Inventors: Richard J. Lech, Burlington, IA (US); Garrett Anderson, Burlington, IA (US); Matthew J. Hennemann, Burlington, IA (US); C. David Anderson, Burlington, IA (US)

(73) Assignee: CNH America LLC, New Holland, PA (US)

(*) Notice: Subject to any disclaimer, the term of this patent is extended or adjusted under 35 U.S.C. 154(b) by 832 days.

(21) Appl. No.: 12/536,717

(22) Filed: Aug. 6, 2009

(65) Prior Publication Data

US 2011/0030363 A1 Feb. 10, 2011

(51) Int. Cl.
*F16D 31/02* (2006.01)

(52) U.S. Cl. ........................................... 60/452; 60/443

(58) Field of Classification Search .................... 60/443, 60/445, 452

See application file for complete search history.

(56) References Cited

U.S. PATENT DOCUMENTS

| | | | |
|---|---|---|---|
| 4,293,284 | A | 10/1981 | Carlson et al. |
| 4,625,625 | A | 12/1986 | Reynolds |
| 5,305,604 | A | 4/1994 | Phillips |
| 5,791,142 | A | 8/1998 | Layne et al. |
| 5,937,645 | A | 8/1999 | Hamamoto |
| 6,318,079 | B1 | 11/2001 | Barber |
| 6,438,952 | B1 | 8/2002 | Nozawa et al. |
| 6,612,109 | B2 | 9/2003 | Mickelson |
| 7,260,931 | B2 | 8/2007 | Egelja et al. |
| 7,434,393 | B2 | 10/2008 | Hesse |
| 7,484,348 | B2 | 2/2009 | Bich |

FOREIGN PATENT DOCUMENTS

| | | | |
|---|---|---|---|
| JP | 404182524 | A | 6/1992 |
| JP | 410159808 | A | 6/1998 |

*Primary Examiner* — Michael Leslie

(74) *Attorney, Agent, or Firm* — Patrick M. Sheldrake

(57) ABSTRACT

An open center hydraulic system that includes a variable displacement pump having an inlet, an outlet and a sensing port, the pump configured to provide reduced fluid flow in response to a predetermined fluid pressure differential between the outlet and the sensing port. A first fluid circuit and a second fluid circuit each serve as signal lines with the pump sensing port. During operation of the second fluid circuit, reduced fluid flow from the pump outlet is achieved as a result of the sum of induced fluid pressure reductions of respective controlled pressure reduction devices approaching the predetermined pump fluid pressure differential.

20 Claims, 5 Drawing Sheets

OPEN CENTER HYDRAULIC SYSTEM

FIELD OF THE INVENTION

The present invention relates generally to hydraulic systems. It relates more particularly to open center hydraulic systems.

SUMMARY OF THE INVENTION

Many work vehicles have elongate members or linkages that are controlled by hydraulic actuators. When the hydraulic actuators are filled with fluid, typically under the control of hydraulic spool valves, the members move with respect to the work vehicle.

One way to increase the craning and breakout specifications on the work vehicle, such as a loader-backhoe, would be to increase the operating pressure of the hydraulic system. However, increasing the operating pressure poses a number of problems. First, the vehicle structure may not be able to withstand dynamic loads that may be encountered during operation at an increased hydraulic pressure and full operating speed. Second, maintaining an increased operating pressure would require increased power requirements if the flow of hydraulic fluid remains constant. In each instance, an increase in weight and power results in increased cost of the vehicle.

What is needed is a hydraulic system having a “boost” mode that provides additional lifting or breakout forces by virtue of selectively increased hydraulic pressure, i.e., selected as needed by the vehicle operator, with the system simultaneously operating at a reduced flow rate of hydraulic fluid. The reduced flow rate of hydraulic fluid would result in slower movement of the vehicle components, similarly reducing the dynamic loads and also reducing the power requirements associated with operation of the vehicle.

SUMMARY OF THE INVENTION

The present invention relates to an open center hydraulic system including a variable displacement pump having an inlet, an outlet and a sensing port, the pump configured to provide reduced fluid flow in response to a predetermined fluid pressure differential between the outlet and the sensing port. A first fluid circuit and a second fluid circuit are in selective fluid communication with the pump. A first controlled pressure reduction device is in fluid communication with the pump outlet and each of the first fluid circuit and the second fluid circuit. A flow regulating device is in fluid communication with the sensing port in each of the first fluid circuit and the second fluid circuit. The first fluid circuit includes a second controlled pressure reduction device and a first maximum pressure limiting device. The second controlled pressure reduction device and the first maximum pressure limiting device are in fluid communication with the pump sensing port during operation of the first fluid circuit. The first maximum pressure limiting device is configured to permit up to a first predetermined fluid pressure value between the pump sensing port downstream of the second controlled pressure reduction device and the first fluid circuit during operation of the first fluid circuit. The second fluid circuit includes a third controlled pressure reduction device, a fourth controlled pressure reduction device and a second maximum pressure limiting device. The third controlled pressure reduction device, the fourth controlled pressure reduction device and the second maximum pressure limiting device are in fluid communication with the pump sensing port during operation of the second fluid circuit. The second maximum pressure limiting device is configured to permit up to a second predetermined fluid pressure value downstream of the fourth controlled pressure reduction device between the pump sensing port and the second fluid circuit during operation of the second fluid circuit. The first controlled fluid pressure reduction device is configured to introduce a first induced fluid pressure reduction between the pump outlet and the first fluid circuit during operation of the first fluid circuit. The first controlled pressure reduction device is configured to introduce a first induced fluid pressure reduction between the pump outlet and the second fluid circuit during operation of the second fluid circuit. The fourth controlled pressure reduction device is configured to introduce a second induced fluid pressure reduction in the second fluid circuit during operation of the second fluid circuit. During operation of the second fluid circuit, reduced fluid flow from the pump outlet is achieved as a result of the sum of the first induced fluid pressure reduction of the first controlled pressure reduction device and the second induced fluid pressure reduction of the fourth controlled pressure reduction device approaching the predetermined pump fluid pressure differential.

The present invention further relates to an open center hydraulic system including a variable displacement pump having an inlet, an outlet and a sensing port, the pump configured to provide reduced fluid flow in response to a predetermined fluid pressure differential between the outlet and the sensing port. A first fluid circuit and a second fluid circuit are in selective fluid communication with the pump. A flow regulating device is in fluid communication with the sensing port in each of the first fluid circuit and the second fluid circuit. A solenoid valve selectively switches between the first fluid circuit and the second fluid circuit. A first controlled pressure reduction device is in fluid communication with the pump outlet and each of the first fluid circuit and the second fluid circuit. The first fluid circuit includes a second controlled pressure reduction device and a first maximum pressure limiting device. The second controlled pressure reduction device and the first maximum pressure limiting device are in fluid communication with the pump sensing port during operation of the first fluid circuit. The first maximum pressure limiting device is configured to permit up to a first predetermined fluid pressure value between the pump sensing port downstream of the second controlled pressure reduction device and the first fluid circuit during operation of the first fluid circuit. The second fluid circuit includes a third controlled pressure reduction device, a fourth controlled pressure reduction device and a second maximum pressure limiting device. The third controlled pressure reduction device, the fourth controlled pressure reduction device and the second maximum pressure limiting device are in fluid communication with the pump sensing port during operation of the second fluid circuit. The second maximum pressure limiting device is configured to permit up to a second predetermined fluid pressure value downstream of the fourth controlled pressure reduction device between the pump sensing port and the second fluid circuit during operation of the second fluid circuit. The first controlled fluid pressure reduction device is configured to introduce a first induced fluid pressure reduction between the pump outlet and the first fluid circuit during operation of the first fluid circuit. The first controlled pressure reduction device is configured to introduce a first induced fluid pressure reduction between the pump outlet and the second fluid circuit during operation of the second fluid circuit. The fourth controlled pressure reduction device is configured to introduce a second induced fluid pressure reduction in the second fluid circuit during operation of the second fluid circuit. During operation of the second fluid circuit, reduced fluid flow from the pump outlet is achieved as a result of the sum of the first induced fluid pressure reduction of the first controlled pressure reduction device and the second induced fluid pressure reduction of the fourth controlled pressure reduction device approaching the predetermined pump fluid pressure differential.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
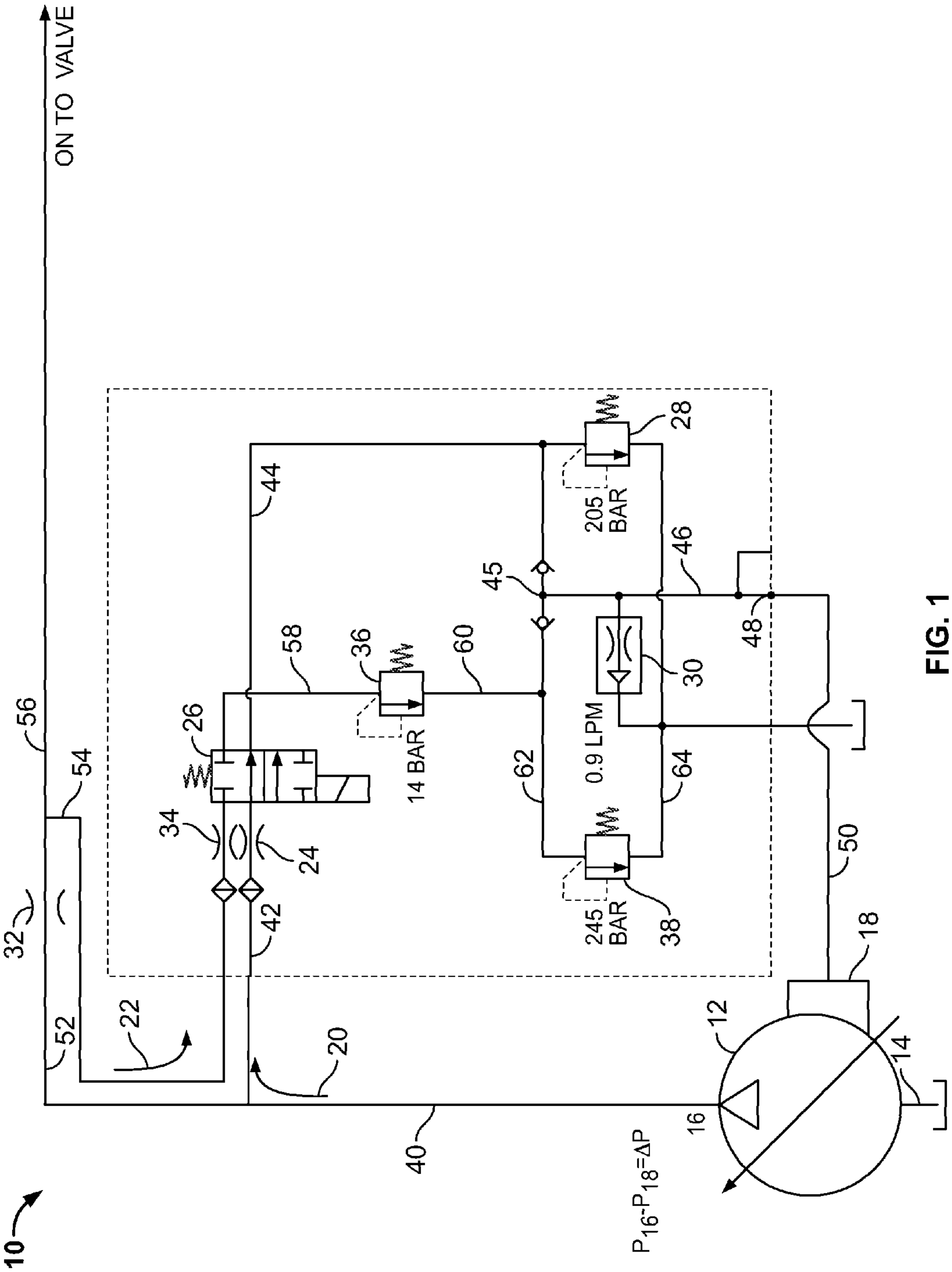
FIG. 1 is a fragmentary schematic of a hydraulic system of the present invention.

FIG. 1 shows a fragmentary schematic of a hydraulic system 10 for use in a hydraulically operated machine, such as a loader-backhoe (not shown). Hydraulic system 10 is an open center hydraulic system that employs a variable displacement pump 12. For purposes of understanding the present application, the values provided for operating parameters of variable displacement pump 12, as well as other components associated with the exemplary embodiment, may vary significantly from the provided values in other applications, and are not intended to be limiting.

Variable displacement pump 12 includes a sensing port 18 that is in selectable fluid communication with either of fluid circuits 20, 22. As shown in FIG. 1, a solenoid valve 26 may be used by an operator of the machine to select between fluid circuits 20, 22. Fluid circuits 20, 22 represent "signal" circuits that control operation of variable displacement pump 12. Variable displacement pump 12 operates within the "margin requirements" also referred to as a predetermined fluid pressure differential between a sensing port 18 and an outlet 16. An inlet 14 of variable displacement pump 12 is associated with a reservoir as shown schematically in the FIGS. In an exemplary embodiment, the predetermined fluid pressure differential is 20 Bar (290 psi). Fluid circuit 20 corresponds to a non-boost mode which is typically a normal operating mode for the machine using hydraulic system 10. Fluid circuit 22 corresponds to a boost mode, resulting in the availability of an increased fluid pressure level provided at outlet 16 of variable displacement pump 12. However, as will be discussed in further detail below, parameters of components associated with fluid circuit 22 and/or hydraulic system 10, control variable displacement pump 12 to provide an increased fluid pressure level provided at outlet 16 of the pump, while simultaneously reducing the flow rate of the pump. For a loader-backhoe, this dual pump control permits additional lifting or breakout forces by virtue of selectively providing increased hydraulic pressure, selected as needed by the vehicle operator, with the system simultaneously operating at a reduced flow rate of hydraulic fluid. The reduced flow rate of hydraulic fluid results in slower movement of the vehicle components, similarly reducing the dynamic loads associated with operation of the vehicle, permitting use of smaller and lighter structural components, resulting in reduced vehicle cost.

As further shown in FIG. 1, fluid circuit 20 (non-boost mode) includes line portions 40, 42 extending from outlet 16 of variable displacement pump 12 to an orifice 24 having a reduced opening compared with line portion 42, with orifice 24 also referred to as a second controlled pressure reduction device ("CPRD"). In an alternate embodiment, orifice 24 may be a valve having a fixed or adjustable pressure reduction value. Line portion 44 extends downstream of orifice 24, and is in fluid communication with solenoid valve 26, a first maximum pressure limiting device 28 (first "MPLD"), and further extends to line juncture 45. Line juncture 45 connects a line juncture 48 via line portion 46 that is connected to a line portion 50 which then connects to sensing port 18 of variable displacement pump 12.

First MPLD 28 is configured to permit up to a first predetermined fluid pressure value, shown as 205 Bar (2973 psi) downstream of orifice 24 and fluid circuit 20, for example, downstream of line juncture 48, during operation of fluid circuit 20. In other words, first MPLD 28, which may be a relief valve of fixed or variable pressure value, places an upper limit on the fluid pressure in fluid circuit 20 (205 Bar (2973 psi)), but permits reduced fluid pressure levels in fluid circuit 20, each of which is provided to sensing port 18 of variable displacement pump 12. For a variable displacement pump 12 having a predetermined fluid pressure differential (ΔP) or margin of 20 Bar (290 psi), as shown by equation [0001]:

$$P_{16}-P_{8}=\Delta P \qquad [0001]$$

where $P_{18}$ represents the fluid pressure from fluid circuit 20 at sensing port 18 and $P_{16}$ represents the fluid pressure produced at outlet 16 of variable displacement pump 12. Therefore, it can be calculated that $P_{16}$ is (225 Bar (3255 psi) at its maximum fluid pressure value.

Figure 2:
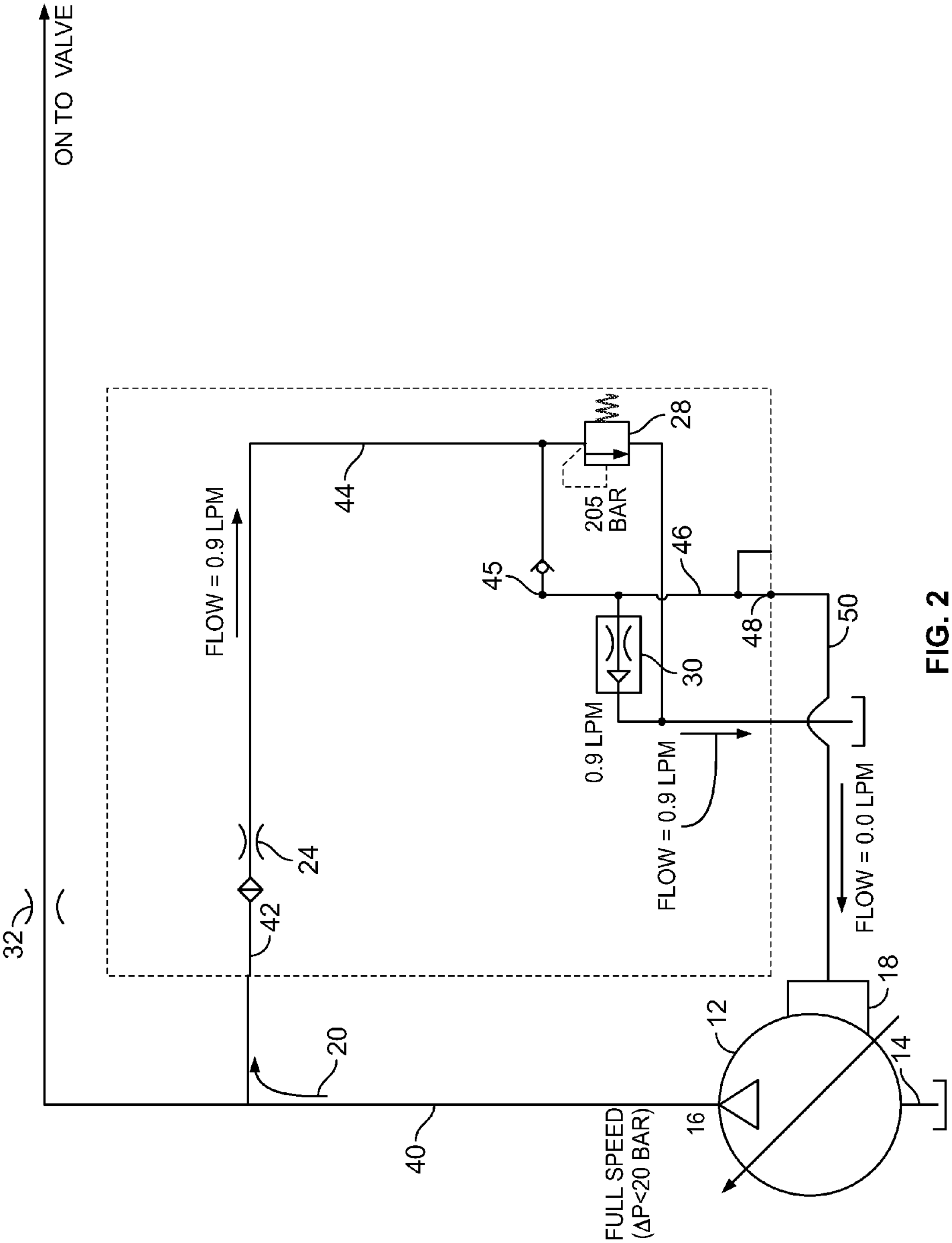
FIG. 2 is a fragmentary schematic of FIG. 1 of one operational mode of the hydraulic system of the present invention.
Figure 3:
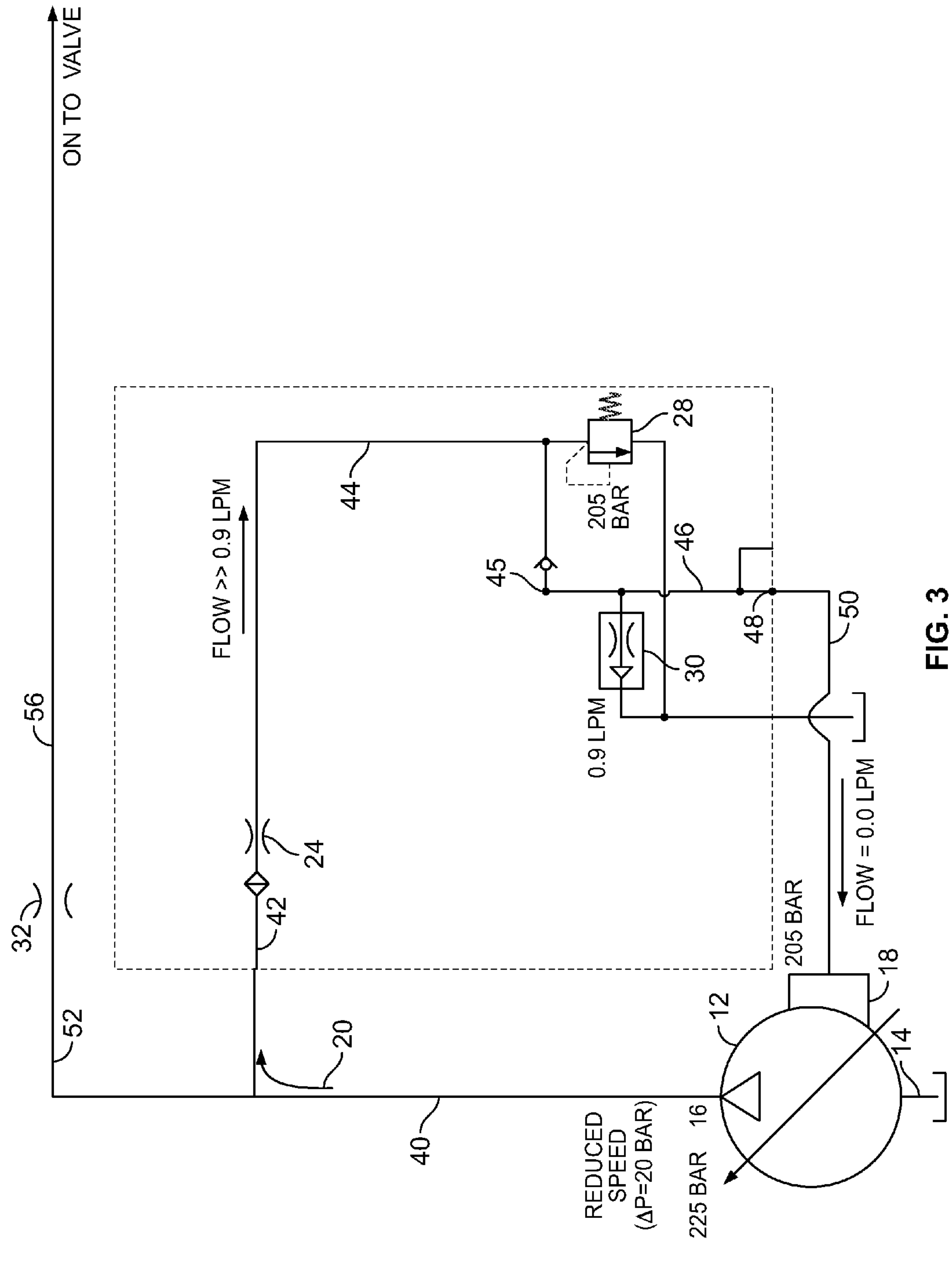
FIG. 3 is a fragmentary schematic of FIG. 1 of one operational mode of the hydraulic system of the present invention.

FIGS. 2 and 3 schematically show two different operating scenarios for fluid circuit 20, i.e., the non-boost mode. In FIG. 2, an exemplary flow rate (0.9 LPM) through orifice 24 of fluid circuit 20 is insufficient to induce a pressure reduction downstream of orifice 24 to equal the pump's predetermined fluid pressure differential (ΔP) or margin of 20 Bar (290 psi). In addition, although the exemplary flow rate is also insufficient to attain the upper limit of fluid pressure in fluid circuit 20 (205 Bar (2973 psi)) as permitted by first MPLD 28 as previously discussed, such knowledge is not required, as the fluid pressure output of variable displacement pump 12 is based on the 20 Bar (290 psi) fluid pressure differential or margin of the pump. As a result, irrespective the fluid pressure at sensing port 18, the fluid pressure at outlet 16 of variable displacement pump 12 will equal the sum of the fluid pressure at sensing port 18 and the pressure reduction through orifice 24. Variable displacement pump 12 will only create enough flow to maintain the fluid pressure in the system. In other words, the difference between the fluid pressure at sensing port 18 and at outlet 16 of variable displacement pump 12 must equal the pressure reduction at orifice 24, if the pressure reduction is within the pump margin, and since the pressure reduction at orifice 24 is not less than the fluid pressure differential or margin of variable displacement pump 12 (20 Bar (290 psi)), the pump will operate at full displacement.

In contrast, as schematically shown in FIG. 3, an exemplary increased flow rate (>>0.9 LPM) through orifice 24 of fluid circuit 20 is sufficient to induce a pressure reduction downstream of orifice 24 to equal the predetermined fluid pressure differential (ΔP) or margin of 20 Bar (290 psi). This increased exemplary flow rate is sufficient to attain the upper limit of fluid pressure in fluid circuit 20 (205 Bar (2973 psi) as permitted (limited) by first MPLD 28 as previously discussed. As a result, the fluid pressure at outlet 16 of variable displacement pump 12 will equal, the sum of the fluid pressure at sensing port 18 (205 Bar (2973 psi) and the magnitude of the pressure reduction through orifice 24 (20 Bar (290 psi)), or 225 Bar (3255 psi). In other words, since the pressure reduction at orifice 24 equals the fluid pressure differential or margin of variable displacement pump 12, the pump will operate at a displacement or generate flow displacement or flow sufficient to maintain the system pressure, which in this instance, is less than full displacement of the pump.

As further shown in FIG. 1, fluid circuit 22 (boost mode) includes line portions 40, 52 extending from outlet 16 of variable displacement pump 12 to an orifice 32 having a reduced opening compared with line portion 52, with orifice 32 also referred to as a first controlled pressure reduction device ("CPRD"). In an alternate embodiment, orifice 32 may be a valve having a fixed or adjustable pressure reduction value. Line portion 54 extends downstream of orifice 32, and is in fluid communication with orifice 34, also referred to as a third CPRD, and solenoid valve 26. Downstream of solenoid valve 26, a line portion 58 extends to a fourth CPRD 36, such as a margin reduction valve, further extending along through line portions 60, 62 in fluid communication with a second maximum pressure limiting device 38 (second "MPLD"), also referred to as a relief valve, and in fluid communication with line juncture 45. Fourth CPRD 36 can also be a check valve with a regulated pressure value, relief valve or an orifice. Line juncture 45 connects a line juncture 48 via line portion 46 that is connected to a line portion 50 which then connects to sensing port 18 of variable displacement pump 12. A flow regulated drain 30 is in fluid communication with line portion 46 to permit "bleed-off" of fluid circuits 20, 22 when switching between the fluid circuits, and allows the pump to return to low pressure when the machine is not in active use.

Second MPLD 38 is configured to permit up to a second predetermined fluid pressure value, shown as 245 Bar (3553 psi) downstream of orifice 34 and fluid circuit 22, for example downstream of line juncture 48, during operation of fluid circuit 22. In other words, second MPLD 38, which may be a relief valve of fixed or of variable pressure value, places an upper limit on the fluid pressure in fluid circuit 22 (245 Bar (3553 psi)), but permits reduced fluid pressure levels in fluid circuit 22, each of which is provided to sensing port 18 of variable displacement pump 12. For a variable displacement pump 12 having a predetermined fluid pressure differential (ΔP) or margin of 20 Bar (290 psi), as previously shown by equation [0002]:

$$P_{16}-P_{18}=\Delta P \qquad [0002]$$

where $P_{18}$ represents the fluid pressure from fluid circuit 22 at sensing port 18 and $P_{16}$ represents the fluid pressure produced at outlet 16 of variable displacement pump 12. Therefore, it can be calculated that $P_{16}$ is 265 Bar (3844 psi) at its maximum fluid pressure value.

Figure 4:
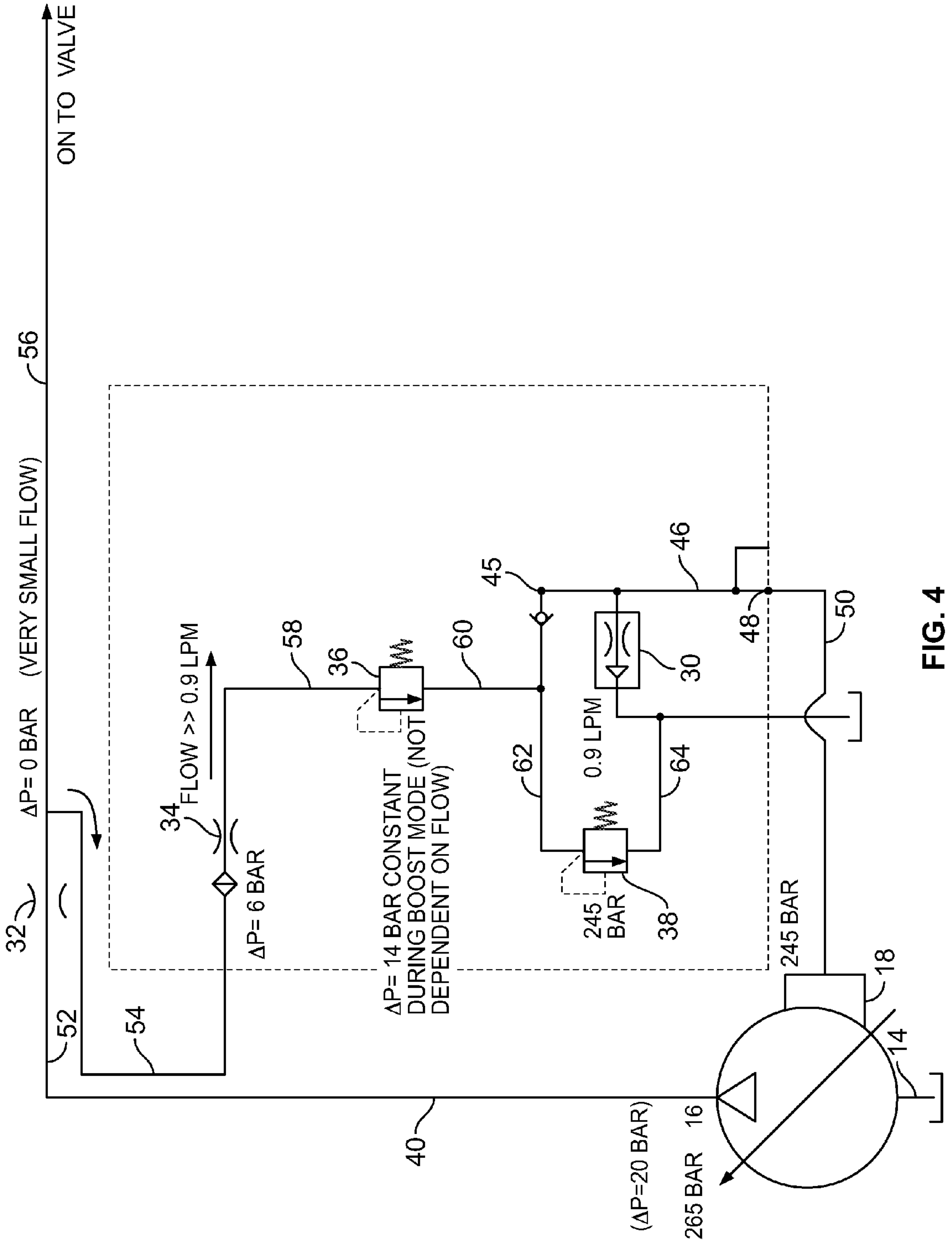
FIG. 4 is a fragmentary schematic of FIG. 1 of an alternate operational mode of the hydraulic system of the present invention.
Figure 5:
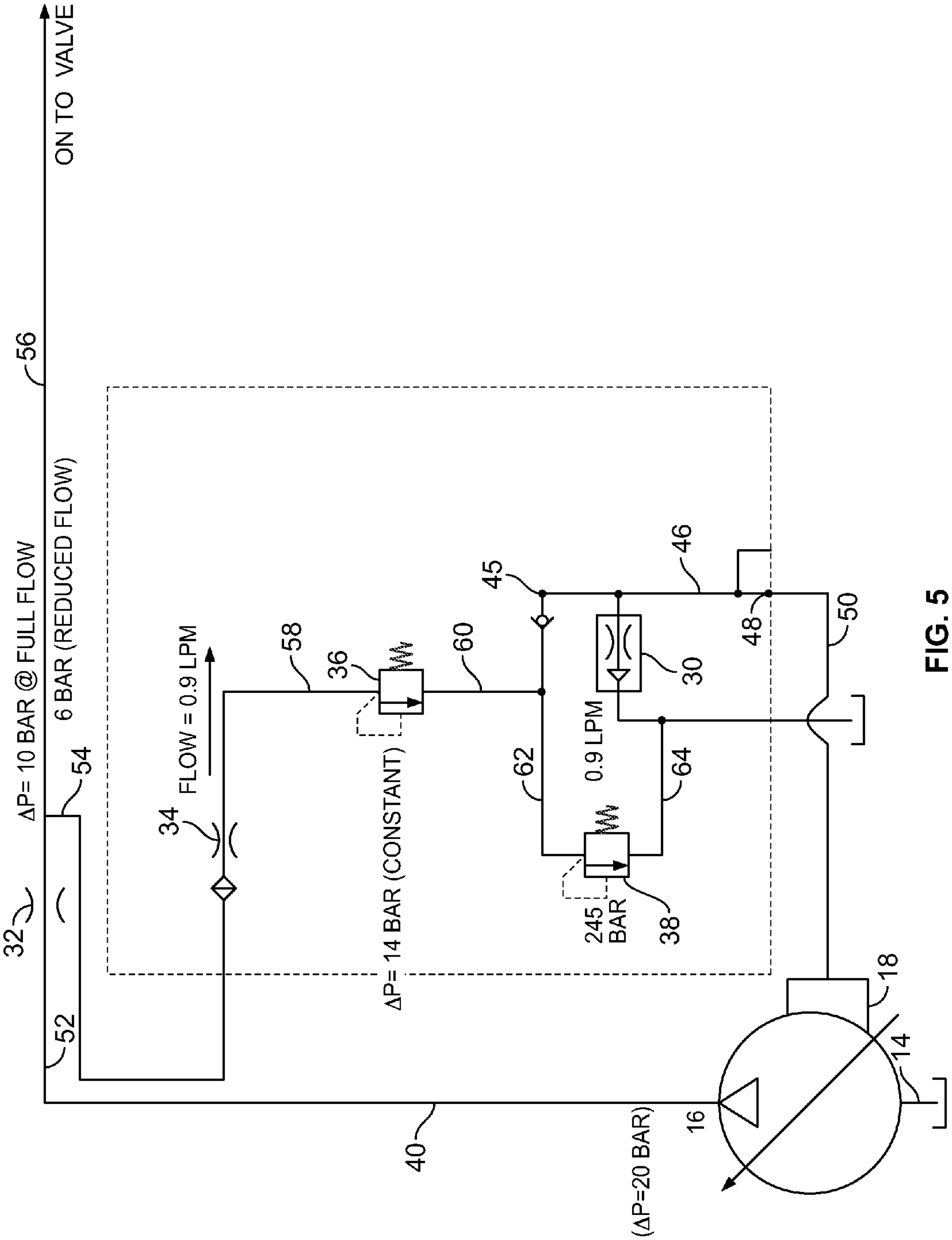
FIG. 5 is a fragmentary schematic of FIG. 1 of an alternate operational mode of the hydraulic system of the present invention.

FIGS. 4 and 5 schematically show two different operating scenarios for fluid circuit 22, i.e., the boost mode. FIG. 4 represents a stalled or maximum pressure condition, for example, where there is reduced fluid flow through orifice 32 provided by outlet 16 of variable displacement pump 12. An exemplary flow rate (>>0.9 LPM) through orifice 34 of fluid circuit 22 is configured to induce a fluid pressure reduction downstream of orifice 34 to equal 6 Bar (87 psi). Downstream of orifice 34 is fourth CPRD 36, which is configured to introduce a second induced fluid pressure reduction in fluid circuit 22, which in this instance is equal to 14 Bar (203 psi). The sum of fluid pressure reductions by respective orifice 34 and fourth CPRD 36 is 20 Bar (290 psi), which equals the predetermined fluid pressure differential (ΔP) or margin of variable displacement pump 12. In other words, since the sum of pressure reductions at orifice 34 and fourth CPRD 36 equals the fluid pressure differential or margin of variable displacement pump 12, the pump will operate at a displacement or output flow rate sufficient to maintain the system pressure (265 Bar (3844 psi)), which in this instance, is nearly zero displacement or zero output flow of the pump, while delivering an increased fluid pressure.

FIG. 5 further illustrates an operating scenario for fluid circuit 22 in boost mode in which variable displacement pump 12 produces reduced flow. The components represented in FIG. 5 are otherwise the same as in FIG. 4, for simplicity. In this operating scenario, the first induced fluid pressure reduction through orifice 32 in response to full flow through a line 56 that is downstream of orifice 32 is 10 Bar (145 psi). As previously discussed, orifice 34, which is downstream of fourth CPRD 36, is configured to introduce a second induced fluid pressure reduction in fluid circuit 22, that is equal to 14 Bar (203 psi). The sum of fluid pressure reductions by respective orifice 34 and fourth CPRD 36 is 24 Bar (348 psi), which exceeds the predetermined fluid pressure differential (ΔP) or margin of variable displacement pump 12. In other words, since the pressure reduction at orifice 34 and fourth CPRD 36 is greater than the fluid pressure differential or margin of variable displacement pump 12, the pump is prevented from operating at full speed. In this scenario, since the fluid pressure differential or margin of variable displacement pump 12 is limited to 20 Bar (290 psi), the output of the pump is thus reduced, and will only induce a fluid pressure reduction at orifice 32 of 6 Bar (87 psi), since the other source of the fluid pressure differential, i.e., fourth CPRD 36 induces a fixed pressure differential value of 14 Bar (203 psi).

It is to be understood that by employing components having different or adjustable fluid pressure reductions, different combinations of maximum pump flow and maximum pump output pressures may be achieved.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An open center hydraulic system comprising:

a variable displacement pump having an inlet, an outlet and a sensing port, the pump configured to provide reduced fluid flow in response to a predetermined fluid pressure differential between the outlet and the sensing port;

a first fluid circuit and a second fluid circuit in selective fluid communication with the pump;

a first controlled pressure reduction device in fluid communication with the pump outlet and each of the first fluid circuit and the second fluid circuit;

a flow regulating device in fluid communication with the sensing port in each of the first fluid circuit and the second fluid circuit;

the first fluid circuit comprising:

a second controlled pressure reduction device; and a first maximum pressure limiting device;

wherein the second controlled pressure reduction device and the first maximum pressure limiting device in fluid communication with the pump sensing port during operation of the first fluid circuit, the first maximum pressure limiting device configured to permit up to a first predetermined fluid pressure value between the pump sensing port downstream of the second controlled pressure reduction device and the first fluid circuit during operation of the first fluid circuit; and the second fluid circuit comprising:

a third controlled pressure reduction device;

a fourth controlled pressure reduction device; and a second maximum pressure limiting device;

wherein the third controlled pressure reduction device, the fourth controlled pressure reduction device and the second maximum pressure limiting device in fluid communication with the pump sensing port during operation of the second fluid circuit, the second maximum pressure limiting device configured to permit up to a second predetermined fluid pressure value downstream of the fourth controlled pressure reduction device between the pump sensing port and the second fluid circuit during operation of the second fluid circuit;

wherein the first controlled fluid pressure reduction device is configured to introduce a first induced fluid pressure reduction between the pump outlet and the first fluid circuit during operation of the first fluid circuit;

wherein the first controlled pressure reduction device is configured to introduce a first induced fluid pressure reduction between the pump outlet and the second fluid circuit during operation of the second fluid circuit;

wherein the fourth controlled pressure reduction device is configured to introduce a second induced fluid pressure reduction in the second fluid circuit during operation of the second fluid circuit;

wherein during operation of the second fluid circuit, reduced fluid flow from the pump outlet is achieved as a result of the sum of the first induced fluid pressure reduction of the first controlled pressure reduction device and the second induced fluid pressure reduction of the fourth controlled pressure reduction device approaching the predetermined pump fluid pressure differential.

2. The system of claim 1, further comprising a solenoid valve for selectively switching between the first fluid circuit and the second fluid circuit.

3. The system of claim 1, wherein the first controlled pressure reduction device is a valve.

4. The system of claim 3, wherein the valve is an orifice.

5. The system of claim 3, wherein the valve is an adjustable valve.

6. The system of claim 1, wherein each of the second controlled pressure reduction device and the third controlled pressure reduction device is a valve.

7. The system of claim 6, wherein the valve is an orifice.

8. The system of claim 6, wherein the valve is an adjustable valve.

9. The system of claim 1, wherein the fourth controlled pressure reduction device is a valve.

10. The system of claim 9, wherein the valve is a relief valve.

11. The system of claim 9, wherein the valve is an adjustable valve.

12. The system of claim 1, wherein at least one of the first maximum pressure limiting device or the second maximum pressure limiting device is a valve.

13. The system of claim 12, wherein the valve is a relief valve.

14. The system of claim 12, wherein the valve is an adjustable valve.

15. The system of claim 9, wherein the valve is a check valve with a regulated pressure value.

16. The system of claim 11, wherein the flow regulating device is in fluid communication with a reservoir.

17. An open center hydraulic system comprising:

a variable displacement pump having an inlet, an outlet and a sensing port, the pump configured to provide reduced fluid flow in response to a predetermined fluid pressure differential between the outlet and the sensing port;

a first fluid circuit and a second fluid circuit in selective fluid communication with the pump;

a flow regulating device in fluid communication with the sensing port in each of the first fluid circuit and the second fluid circuit;

a solenoid valve for selectively switching between the first fluid circuit and the second fluid circuit;

a first controlled pressure reduction device in fluid communication with the pump outlet and each of the first fluid circuit and the second fluid circuit;

the first fluid circuit comprising:

a second controlled pressure reduction device; and a first maximum pressure limiting device, the second controlled pressure reduction device and the first maximum pressure limiting device in fluid communication with the pump sensing port during operation of the first fluid circuit, the first maximum pressure limiting device configured to permit up to a first predetermined fluid pressure value between the pump sensing port downstream of the second controlled pressure reduction device and the first fluid circuit during operation of the first fluid circuit; and the second fluid circuit comprising:

a third controlled pressure reduction device;

a fourth controlled pressure reduction device; and a second maximum pressure limiting device, the third controlled pressure reduction device, the fourth controlled pressure reduction device and the second maximum pressure limiting device in fluid communication with the pump sensing port during operation of the second fluid circuit, the second maximum pressure limiting device configured to permit up to a second predetermined fluid pressure value downstream of the fourth controlled pressure reduction device between the pump sensing port and the second fluid circuit during operation of the second fluid circuit;

wherein the first controlled fluid pressure reduction device is configured to introduce a first induced fluid pressure reduction between the pump outlet and the first fluid circuit during operation of the first fluid circuit;

wherein the first controlled pressure reduction device is configured to introduce a first induced fluid pressure reduction between the pump outlet and the second fluid circuit during operation of the second fluid circuit;

wherein the fourth controlled pressure reduction device is configured to introduce a second induced fluid pressure reduction in the second fluid circuit during operation of the second fluid circuit;

wherein during operation of the second fluid circuit, reduced fluid flow from the pump outlet is achieved as a result of the sum of the first induced fluid pressure reduction of the first controlled pressure reduction device and the second induced fluid pressure reduction of the fourth controlled pressure reduction device approaching the predetermined pump fluid pressure differential.

18. The system of claim 17, wherein the first controlled pressure reduction device is a valve.

19. The system of claim 18, wherein the valve is an orifice.

20. The system of claim 17, wherein at least one of the first maximum pressure limiting device or the second maximum pressure limiting device is a relief valve.

* * * * *